United States Patent [19]

Yumoto et al.

[11] Patent Number: 4,888,978
[45] Date of Patent: Dec. 26, 1989

[54] INSTRUMENT TO MEASURE LEAKAGE OF STEAM FROM A STEAM TRAP

[75] Inventors: Hideaki Yumoto; Masao Yonemura; Yoshito Yamada, all of Hyogo, Japan

[73] Assignee: TLV Co., Ltd., Hyogo, Japan

[21] Appl. No.: 274,668

[22] Filed: Nov. 21, 1988

Related U.S. Application Data

[63] Continuation-in-part of Ser. No. 84,481, Aug. 11, 1987, abandoned.

Foreign Application Priority Data

Aug. 11, 1986 [JP] Japan ............................ 61-188847

[51] Int. Cl.$^4$ ............................................. G01M 3/26
[52] U.S. Cl. ........................................... 73/40; 73/200
[58] Field of Search .................. 73/40, 40.5 R, 40.5 A, 73/200; 137/171

[56] References Cited

U.S. PATENT DOCUMENTS

| | | | |
|---|---|---|---|
| 2,703,981 | 3/1955 | Mattix | 73/861.53 |
| 4,468,962 | 9/1984 | Keech et al. | 73/200 |
| 4,502,322 | 3/1985 | Tero | 73/40.5 A |
| 4,570,489 | 2/1986 | Baumaire et al. | 73/40.5 A |

FOREIGN PATENT DOCUMENTS

| 206927 | 12/1983 | Japan | 73/200 |
|---|---|---|---|
| 212525 | 9/1987 | Japan . | |

Primary Examiner—Hezron E. Williams
Attorney, Agent, or Firm—Toren, McGeady & Associates

[57] ABSTRACT

An instrument to measure leakage of steam which determines the operation status of a steam trap, e.g., if the steam is leaking or not, and measures the leakage rate of the steam and is devised to prevent rippling on the water surface at the primary side of a bulkhead in the instrument installed between the steam supply side and the steam trap so as to measure the quantity of steam leakage from the water level at the primary side of the bulkhead and the gas quantity passing through a passage formed in the bulkhead.

6 Claims, 1 Drawing Sheet

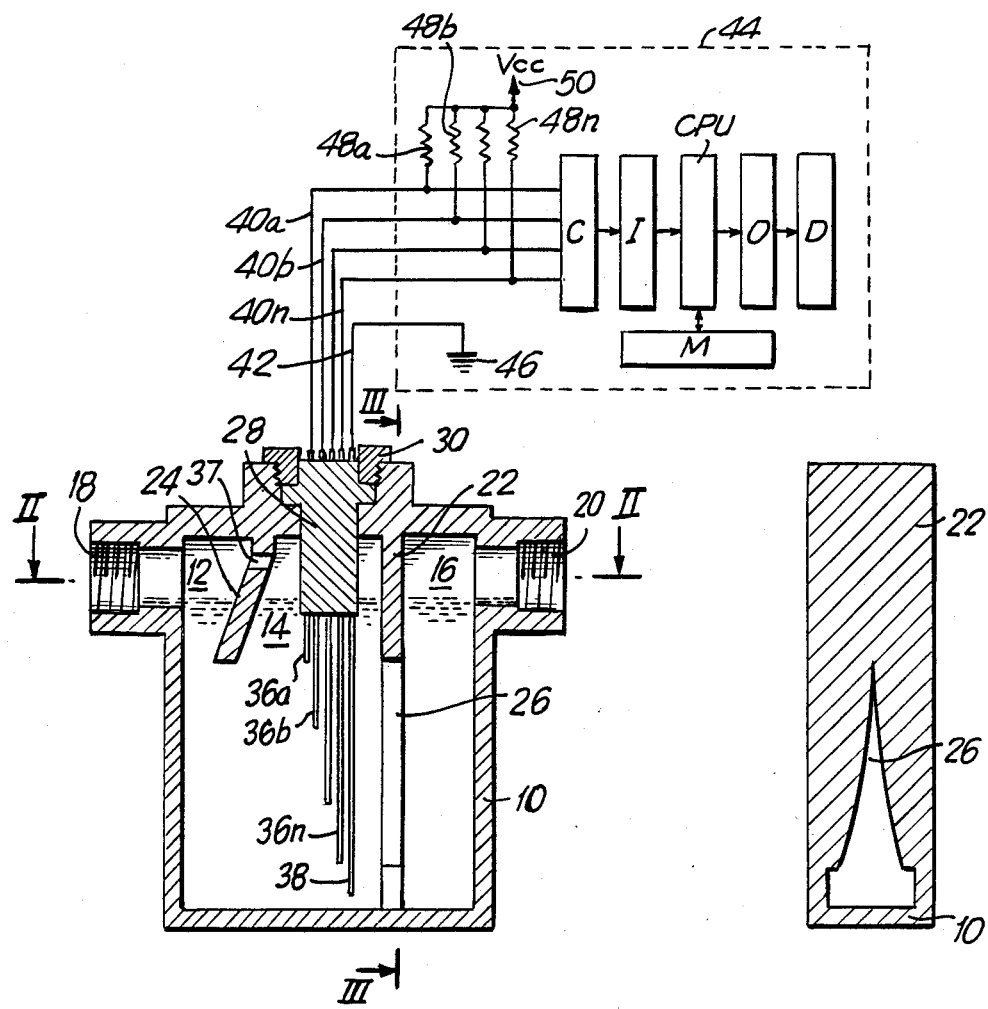
FIG. 1
FIG. 3
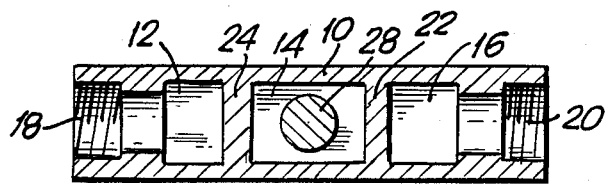
FIG. 2

INSTRUMENT TO MEASURE LEAKAGE OF STEAM FROM A STEAM TRAP

This is a continuation-in-part of application Ser. No. 07/084,481, filed Aug. 11, 1987 now abandoned.

BACKGROUND OF THE INVENTION

1. Field of the Invention

The present invention relates to an instrument to measure leakage of steam from a steam trap which determines the operational status of the trap, e.g., if the steam is leaking or not, or which measures the leakage rate of steam.

2. Description of the Prior Art

A steam trap is a device attached to a steam pipeline or to equipment using steam and which automatically discharges only the condensed water without leaking out steam. Since leakage of steam must be monitored more strictly with increasing fuel cost, avoiding leakage of steam becomes more of a prerequisite in adopting a steam trap. After completion of the piping, steam traps are strictly monitored for steam leakage and those leaking steam are repaired or replaced.

Various leakage measuring instruments for steam traps have thus far been developed and actually used.

One type of instrument provides a through-vision window in the outlet piping of the steam trap to visually check the condition of flow inside the pipe. Other types applying a thermometer or vibration meter have been used to measure the surface temperature of the steam trap or the sound of fluid flow. However, neither of these methods were able to observe the condition of leakage qualitatively and they were not able to measure the leakage amount quantitatively. Therefore, it was necessary that the extent of the leakage be judged only by relying on human observation.

Therefore, applicant has developed a simple instrument to measure leakage of steam from a steam trap which is disclosed in Japanese Patent Application No. 56521 of 1986. This instrument is to be arranged between the steam supply side and the steam trap and measures the quantity of steam leakage based upon the interrelationship between the steam quantity passing the orifice and the water level at the primary side.

The foregoing instrument, however, presents a problem in that an accurate measurement of steam leakage is impossible because water level before and after the orifice changes with the quantity of condensed water flow in the measuring equipment and also the water level of the primary side of the orifice ripples.

SUMMARY OF THE INVENTION

The present invention therefore is directed toward providing a device for obtaining an accurate measurement of steam leakage without being affected by the flow-in condensed water and change in its quantity.

In accordance with the invention, there is provided a steam leakage measuring instrument including a casing forming a liquid retaining chamber and a fluid inlet port and a fluid outlet port at the upper parts of the liquid retaining chamber. A bulkhead is prepared in the liquid retaining chamber to separate the inlet chamber connected to the inlet port and outlet chamber connected to the outlet port, an opening is formed to connect the inlet chamber and the outlet chamber at a portion lower than the inlet and outlet openings of the bulkhead, and a partition extending lower than the inlet opening in the inlet chamber is provided to separate the inlet chamber to inlet port side space and measuring chamber. Means are provided to measure water level in the measuring chamber and also means to calculate and indicate the leaked steam quantity based on the interrelationship between the detected water level value from the water level measuring means and the quantity of gas passing through the opening formed in the bulkhead.

A port for gas passage may be formed in the partition above the water level at the maximum flow rate of the liquid.

The inlet port and the outlet port are connected to the steam feed side and steam trap side respectively. While the steam trap is operating normally, the water levels in the inlet side space, in the outlet chamber and in the measuring chamber are the same. When steam leaks from the steam trap, steam in an amount corresponding to the leakage amount flows from the inlet to the outlet passing along the lower end of the partition and through the opening formed in the bulkhead, and the water level of the measuring chamber is lowered. This water level reduction is detected by water level detecting means such as an electrode or a float. From the interrelation between the water level and the gas volume passing through the opening in the bulkhead, a flow rate computing indicator, calculates and indicates the steam leakage quantity.

The interrelation between the water level on the upstream side of the bulkhead and the steam quantity passing through the opening in the bulkhead can be experimentally ascertained, taking into account water level reductions due to extra steam supply for compensation of pressure losses following condensation as a result of heat radiation in the piping downstream of the instrument.

When the load at the upstream steam generating means changes and/or steam is consumed downstream of the steam trap the forming of condensate will vary.

In case the forming of condensate increases due to upstream load variations the inflow of condensate into the instrument increases and the water level in the inlet side space, in the measuring chamber and in the outlet side space will rise equally.

When the condensed water flow into the inlet port increases due to downstream steam consumption or due to substantial leakage at the steam trap, the water levels in the inlet chamber and the outlet chamber will rise, however, the water level in the measuring chamber is lowered because of the substantial amount of steam forcing its way along the lower edge of the partition and through the opening in the bulkhead. If, however, there is no downstream steam consumption and there is a small leakage at the steam trap, a corresponding extra amount of steam passes through the instrument, into the inlet side space, through the gas passage in the partition and through the opening in the bulkhead and out of the outlet port. The water levels in the inlet side space and in the outlet side space rise and the water level in the measuring chamber is lowered in an accurately measurable amount. Further, the water surface of the inlet space ripples by the condensed water flowing in from the inlet, however, the water surface within the measuring chamber does not ripple because this chamber is separated from the inlet space by a partition.

This passage for gas should therefore be formed at a higher level than the water level in the measuring chamber at maximum water flow rate. When the leakage of steam is small, steam flows into the measuring chamber only through the passage for gas and not along the underside of the partition and the measuring chamber is kept separated from the inlet space by the partition, and the water level in the measuring chamber does not ripple. When the steam leakage increases, steam also flows into the measuring chamber along the underside of the partition, however, this also does not effect the measuring accuracy largely because the steam leakage is large.

The present invention generates the following specific effect.

The water level in the measuring chamber does not change with the change in the quantity of condensed water flowing in and the water surface in the measuring chamber does not ripple due to the inflowing condensed water. Therefore, accurate measurement of steam leakage can be performed.

BRIEF DESCRIPTION OF THE DRAWINGS

The above and other objects, features and advantages of the present invention will become apparent from the following description and the appended claims, taken in conjunction with the accompanying drawings, wherein:

FIG. 1 is a sectional view of an instrument to measure leakage of steam from a steam trap in accordance with an embodiment of the invention;

FIG. 2 is a sectional view taken at FIG. 1 along the line II—II; and

FIG. 3 is a sectional view taken at FIG. 1 along the line III—III.

DESCRIPTION OF THE PREFERRED EMBODIMENT

Referring now to the drawings wherein a preferred embodiment of the invention is depicted, an instrument in accordance with the invention is shown which comprises a casing 10 forming a liquid retaining chamber 12, 14, 16, an inlet port 18 and an outlet port 20 opened to the upper part of the retaining chamber respectively. The casing 10 has sufficient strength to bear the internal liquid pressure.

A bulkhead 22 and a partition 24 are provided from the top of the liquid retaining chamber. The bulkhead 22 and partition 24 separate the liquid retaining chamber into an inlet side space 12 connected to the inlet port 18, a measuring chamber 14 and an outlet chamber 16 connected to the outlet port 20.

The inlet side space 12 and the measuring chamber 14 are connected by the underside of the partition 24 and a passage for gas 37 formed in the partition 24 for passing gases, the measuring chamber 14 and the outlet chamber 16 are connected through a weir 26 formed in the lower part of the bulkhead 22.

The lower end of the partition 24 and an upper end of the weir 26 formed in the bulkhead 22 are located lower than the openings of inlet port 18 and outlet port 20.

The passage for gas 37 prepared in the partition 24 is located higher than the water level at the maximum flow rate of the liquid.

A plurality of electrodes 36a, 36b, ... 36n having different heights and an earth bar 38 are attached to an attaching member 28 through the top wall of the measuring chamber 14. The attaching member 28 is formed of insulation material, and is attached to the casing 10 with a fixing member 30. The electrodes 36a, 36b, ... 36n and the earth bar 38 are connected to an arithmetic indicator 44 through pipes 40a, 40b, ... 40n, 42. The arithmetic indicator 44 calculates the quantity of steam leakage from the interrelation between the water level and the volume of gas passing the weir 26. The earth bar 38 is connected to ground 46 inside the arithmetic indicator 44. The electrodes 36a, 36b, ... 36n are connected to a power source 50 through suitable resistors 48a, 48b, ... 48n. The arithmetic indicator 44 is constituted of a signal converter C, an input interface I, a central processing unit CPU, a memory M, an output interface O, and an indicator D.

The inlet port 18 and the outlet port 20 are connected to a steam feeding means and to the steam trap. If the steam trap is operating normally (without leakage of steam and discharging only condensed water), the water levels in the inlet side space 12, in the outlet chamber 16 and in the measuring chamber 14 are identical as shown in FIG. 1. In the piping between the outlet port 20 and the steam trap some condensation occurs due to heat radiation. The pressure drop due to this condensation is compensated by extra steam supply through inlet port 18 in the same amount as condensated, flows through opening 37 or along lower edge of partition 24 into chamber 14. When the steam trap opens to discharge condensed water, the same quantity thereof passes through weir opening 26. This does not affect the equal level situation in 12, 14 and 26 as depicted in FIG. 1. If, however, steam leakage occurs at the steam trap the exit side pressure at 20 reduces largely and a substantial quantity of steam, corresponding to the steam leakage, flows from the inlet port 18 along the underside of the partition 24 and the weir 26, towards the outlet port 20, and the water level in the measuring chamber 14 lowers.

Electric potentials between the electrodes and the resistors change because electric currents flow into the electrodes soaked in the condensed water through the condensed water. ON-OFF signals due to the voltage variation in the electrodes are converted to binary signals in the signal converter C, and are inputted into the microcomputer CPU through the input interface I. The microcomputer CPU detects the water level with the above signals and calculates the quantity of steam leakage from the interrelation between the water level and the gas volume passing through the weir 26, which are previously stored in the memory M. The result of the calculation is indicated on the indicator D through the output interface O.

In case of a small leakage at the steam trap the small amount of compensating steam flows from the inlet port 18 to the measuring chamber 14 only through passage 37. The small lowering of the water level in chamber 14 can be accurately measured.

While a specific embodiment of the invention has been shown and described in detail to illustrate the application of the inventive principles, it will be understood that the invention may be embodied otherwise without departing from such principles.

What is claimed is:

1. An instrument for measuring leakage of steam in a steam trap comprising:
   means forming a liquid retaining chamber;
   means defining a fluid inlet port and a fluid outlet port to and from said retaining chamber;
   bulkhead means in said liquid retaining chamber separating said chamber into an inlet chamber in flow communication with said inlet port and an outlet chamber in flow communication with said outlet port;

means defining openings connecting said inlet chamber and said outlet chamber at a part lower than said inlet and outlet ports;

partition means in said inlet chamber extending to a location lower than said inlet port separating said inlet chamber into an inlet space and a measuring chamber;

means for measuring water level in said measuring chamber;

means for calculating steam leakage quantity based upon an interrelationship between water level as measured by said measuring means and gas volume passing through an opening formed in said bulkhead means; and means for indicating the steam leakage quantity calculated by said calculating means.

2. An instrument according to claim 1, in which a passage for the passage of gas is formed on said partition means at a location higher than a water level in said liquid retaining chamber at the highest liquid flow rate.

3. An instrument for measuring leakage of steam in a steam trap comprising:

means for forming an upright liquid retaining chamber;

means for defining a fluid inlet port and a fluid outlet port to and from said retaining chamber with said ports located at the same level;

bulkhead means in said liquid retaining chamber for separating said chamber into an inlet chamber in flow communication said inlet port and an outlet chamber in flow communication with said outlet port;

means in said bulkhead means for defining openings connecting said inlet chamber and said outlet chamber at a level lower than said inlet and outlet ports;

partition means in said inlet chamber extending downwardly from the upright range of said inlet and outlet ports to a level lower than said inlet port for separating said inlet chamber into an inlet space communicating with said inlet port and a measuring chamber;

means for measuring water level in said measuring chamber;

means for calculating steam leakage quantity based upon an interrelationship between water level as measured by said measuring mean and gas volume passing through an opening formed in said bulkhead means; and means for indicating the steam leakage quantity calculated by said calculating means.

4. An instrument according to claim 3, wherein a passage for the passage of gas is formed in said partition means at a location higher than a water level in said liquid retaining chamber at the highest liquid flow rate.

5. An instrument according to claim 4, wherein said means for forming a chamber comprises an upright casing having a top and a bottom, said bulkhead means comprises a wall extending between said top and said bottom, and said means in said bulkhead means comprises a upwardly extending weir formed through said wall and extending vertically from adjacent said bottom to a point below the level of said outlet port.

6. An instrument, as set forth in claim 5, comprising a wall extending downwardly from said top to a point below the level of said inlet port and an opening in said wall in the range of said inlet port for communicating between said inlet space and said measuring chamber.

* * * * *